United States Patent
Hong

(10) Patent No.: US 11,916,646 B2
(45) Date of Patent: Feb. 27, 2024

(54) METHOD FOR PROVIDING FLIGHT PATH OF UNMANNED AERIAL VEHICLE, OBTAINING METHOD, APPARATUS, AND SYSTEM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 487 days.

(21) Appl. No.: 17/272,019

(22) PCT Filed: Aug. 30, 2018

(86) PCT No.: PCT/CN2018/103358
§ 371 (c)(1),
(2) Date: Feb. 26, 2021

(87) PCT Pub. No.: WO2020/042117
PCT Pub. Date: Mar. 5, 2020

(65) Prior Publication Data
US 2021/0351840 A1   Nov. 11, 2021

(51) Int. Cl.
*H04B 7/185* (2006.01)
*H04W 76/27* (2018.01)
(Continued)

(52) U.S. Cl.
CPC ....... *H04B 7/18506* (2013.01); *B64C 39/024* (2013.01); *H04W 68/005* (2013.01); *H04W 76/27* (2018.02); *B64U 2201/20* (2023.01)

(58) Field of Classification Search
CPC ............ H04B 7/18506; H04W 68/005; H04W 76/27; B64C 39/024; B64U 2201/20
See application file for complete search history.

(56) References Cited

U.S. PATENT DOCUMENTS

2015/0336668 A1   11/2015   Pasko et al.
2016/0330771 A1   11/2016   Tan
(Continued)

FOREIGN PATENT DOCUMENTS

CN   104053197 A   9/2014
CN   105556408 A   5/2016
(Continued)

OTHER PUBLICATIONS

First Office Action of Chinese Application No. 202110982483.X dated Jun. 22, 2022.
(Continued)

*Primary Examiner* — Gerald Johnson
(74) *Attorney, Agent, or Firm* — Finnegan, Henderson, Farabow, Garrett & Dunner, L.L.P

(57) ABSTRACT

A method for providing a flight path of an unmanned aerial vehicle includes: sending, by a first access network device, paging signaling, wherein the paging signaling is configured to page the unmanned aerial vehicle in an inactive state; receiving, by the first access network device, a radio resource control (RRC) connection resume request sent from the unmanned aerial vehicle in response to receiving the paging signaling; and sending, by the first access network device, flight path information of the unmanned aerial vehicle provided by a core network device to the unmanned aerial vehicle in response to receiving the RRC connection resume request.

15 Claims, 5 Drawing Sheets

(51) Int. Cl.
*B64C 39/02* (2023.01)
*H04W 68/00* (2009.01)

(56) References Cited

U.S. PATENT DOCUMENTS

| | | |
|---|---|---|
| 2017/0178518 A1 | 6/2017 | Foladare et al. |
| 2017/0186329 A1 | 6/2017 | Gao et al. |
| 2017/0288768 A1 | 10/2017 | Shaw et al. |
| 2018/0035306 A1 | 2/2018 | Zavesky et al. |
| 2018/0220486 A1 | 8/2018 | Tseng et al. |
| 2019/0138013 A1 | 5/2019 | Wu et al. |
| 2019/0229789 A1* | 7/2019 | Zhang ................. H04B 7/0695 |
| 2020/0214073 A1* | 7/2020 | Shimoda ............... H04W 16/32 |
| 2020/0258397 A1 | 8/2020 | Hong |
| 2021/0297921 A1* | 9/2021 | Pragada ................ H04W 36/32 |

FOREIGN PATENT DOCUMENTS

| | | |
|---|---|---|
| CN | 106134247 A | 11/2016 |
| CN | 107239078 A | 10/2017 |
| CN | 107770863 A | 3/2018 |
| CN | 107924188 A | 4/2018 |
| CN | 108064360 A | 5/2018 |
| CN | 108064465 A | 5/2018 |
| CN | 108401438 A | 8/2018 |
| CN | 108401477 A | 8/2018 |
| WO | WO 2018/036609 A1 | 3/2018 |

OTHER PUBLICATIONS

International Search Report and Written Opinion of PCT Application No. PCT/CN2018/103358 dated May 30, 2019.
First Office Action of Chinese Application No. 201880001216.6 dated Jul. 8, 2020.

* cited by examiner

METHOD FOR PROVIDING FLIGHT PATH OF UNMANNED AERIAL VEHICLE, OBTAINING METHOD, APPARATUS, AND SYSTEM

CROSS REFERENCE TO RELATED APPLICATIONS

This application is a national phase application based on International Application No. PCT/CN2018/103358, filed Aug. 30, 2018, the content of which is incorporated herein by reference.

TECHNICAL FIELD

The present disclosure relates to the field of communication technologies, and in particular, relates to a method, apparatus and system for providing a flight path of an unmanned aerial vehicle, and a method and apparatus for acquiring the flight path of the unmanned aerial vehicle.

BACKGROUND

An unmanned aircraft is referred to as an "unmanned aerial vehicle". At present, the unmanned aerial vehicles have been used in a variety of fields, such as vegetation protection, film and television shooting, surveying and mapping, scientific investigation, and power inspection.

The unmanned aerial vehicle supports two flight modes, a fixed mode in which the unmanned aerial vehicle flies based on a planned flight path, and a dynamic mode in which the unmanned aerial vehicle flies based on real-time control of a controller.

For the fixed mode, how the unmanned aerial vehicle acquires a flight path from an unmanned aerial vehicle management system is an urgent problem to be solved.

SUMMARY

According to a first aspect of the embodiments of the present disclosure, a method for providing a flight path of an unmanned aerial vehicle is provided. The method includes:
  sending, by a first access network device, paging signaling, wherein the paging signaling is used to page the unmanned aerial vehicle in an inactive state;
  receiving, by the first access network device, a radio resource control (RRC) connection resume request sent from the unmanned aerial vehicle in response to receiving the paging signaling; and
  sending, by the first access network device, flight path information of the unmanned aerial vehicle provided by a core network device to the unmanned aerial vehicle in response to receiving the RRC connection resume request.

According to a second aspect of the embodiments of the present disclosure, a method for acquiring a flight path of an unmanned aerial vehicle is provided. The method includes:
  receiving, by the unmanned aerial vehicle, paging signaling from a first access network device, wherein the paging signaling is used to page the unmanned aerial vehicle in an inactive state;
  sending, by the unmanned aerial vehicle, a radio resource control (RRC) connection resume request to the first access network device in response to receiving the paging signaling; and
  receiving, by the unmanned aerial vehicle, flight path information of the unmanned aerial vehicle provided by a core network device from the first access network device.

According to a third aspect of the embodiments of the present disclosure, an apparatus for providing a flight path of an unmanned aerial vehicle is provided. The apparatus includes:
  a paging module, configured to send paging signaling, wherein the paging signaling is configured to page the unmanned aerial vehicle in an inactive state;
  a receiving module, configured to receive a radio resource control (RRC) connection resume request sent from the unmanned aerial vehicle in response to receiving the paging signaling; and
  a sending module configured to send flight path information of the unmanned aerial vehicle provided by a core network device to the unmanned aerial vehicle in response to receiving the RRC connection resume request.

According to a fourth aspect of the embodiments of the present disclosure, an apparatus for acquiring a flight path of an unmanned aerial vehicle is provided. The apparatus includes:
  a receiving module, configured to receive paging signaling from a first access network device, wherein the paging signaling is used to page the unmanned aerial vehicle in an inactive state; and
  a sending module, configured to send a radio resource control (RRC) connection resume request to the first access network device in response to receiving the paging signaling;
  wherein the receiving module is further configured to receive flight path information of the unmanned aerial vehicle provided by a core network device from the first access network device.

According to a fifth aspect of the embodiments of the present disclosure, an apparatus for providing a flight path of an unmanned aerial vehicle is provided. The apparatus includes:
  a processor; and
  a memory configured to store an instruction executable by the processor;
  wherein the processor is configured to:
  send paging signaling, wherein the paging signaling is used to page the unmanned aerial vehicle in an inactive state;
  receive an RRC connection resume request sent from the unmanned aerial vehicle in response to receiving the paging signaling; and
  send flight path information of the unmanned aerial vehicle provided by a core network device to the unmanned aerial vehicle in response to receiving the RRC connection resume request.

According to a sixth aspect of the embodiments of the present disclosure, an apparatus for acquiring a flight path of an unmanned aerial vehicle is provided. The apparatus includes:
  a processor; and
  a memory configured to store an instruction executable by the processor;
  wherein the processor is configured to:
  receive paging signaling from a first access network device, wherein the paging signaling is used to page the unmanned aerial vehicle in an inactive state;

send an RRC connection resume request to the first access network device in response to receiving the paging signaling; and receive flight path information of the unmanned aerial vehicle provided by a core network device from the first access network device.

According to a seventh aspect of the embodiments of the present disclosure, a system for providing a flight path of an unmanned aerial vehicle is provided. The system includes a first access network device and the unmanned aerial vehicle; wherein the first access network device includes the apparatus as described in the third aspect and the unmanned aerial vehicle includes the apparatus as described in the fourth aspect; or the first access network device includes the apparatus as described in the fifth aspect and the unmanned aerial vehicle includes the device as described in the sixth aspect.

According to an eighth aspect of the embodiments of the present disclosure, a non-transitory computer-readable storage medium is provided. The non-transitory computer-readable storage medium stores a computer program thereon. The computer program, when run by a processor, performs steps of the method as described in the first aspect or perform steps of the method as described in the second aspect.

The technical solutions according to the embodiments of the present disclosure can achieve the following beneficial effects.

For the unmanned aerial vehicle in the inactive state, the access network device sends the paging signaling to the unmanned aerial vehicle; the unmanned aerial vehicle sends the RRC connection resume request to the access network device in response to receiving the paging from the access network device for the unmanned aerial vehicle; and the access network device subsequently sends the flight path information of the unmanned aerial vehicle provided by the core network device to the unmanned aerial vehicle, in an RRC connection resume process or in response to resuming the RRC connection. In this way, the flight path information of the unmanned aerial vehicle is issued, such that the unmanned aerial vehicle can acquire the flight path information.

It should be understood that both the above general description and the following detailed description are exemplary and illustrative only and are not intended to limit the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Figure 1:
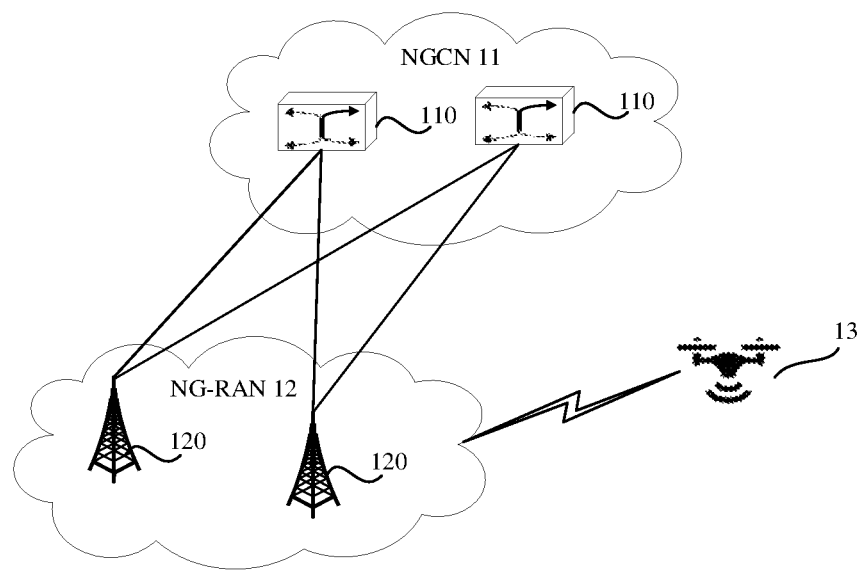
FIG. 1 is a structural diagram of a network architecture according to an exemplary embodiment.

Exemplary embodiments are described in detail here, examples of which are illustrated in the accompanying drawings. Where the following description hereinafter refers to the accompanying drawings, like reference numerals in different drawings represent the same or similar elements, unless otherwise specified. The embodiments set forth in the following description of exemplary embodiments do not represent all embodiments consistent with the present disclosure. Instead, they are merely examples of apparatuses and methods consistent with some aspects related to the present disclosure as recited in the appended claims.

A network architecture and service scenarios are described in the embodiments of the present disclosure for more clearly illustrating the technical solutions according to the embodiments of the present disclosure, instead of constituting a limitation to the technical solutions according to the embodiments of the present disclosure. A person of ordinary skill in the art would know that with evolution of the network architecture and the emergence of new service scenarios, the technical solutions according to the embodiments of the present disclosure are equally applicable to similar technical problems.

FIG. 1 is a structural diagram of a network architecture according to an exemplary embodiment. The network architecture only takes the 5G system (also referred to as a new radio (NR) system) as an example. The network architecture may include a next generation core network (NGCN) 11, a new generation-radio access network (NG-RAN) 12, and an unmanned aerial vehicle 13.

The NGCN 11 is a core network of the 5G system. The core network includes a number of core network devices 110. The core network device 110 is mainly responsible for user connection, user management and service bearing, and provides an interface to an external network as a bearer network. For example, the NGCN 11 includes an access and mobility management function (AMF) entity, a user plane function (UPF) entity, and a session management function (SMF) entity.

The NG-RAN 12 is an access network of the 5G system. The access network includes a number of access network devices 120. The access network device 120 and the core network device 110 communicate with each other by virtue of the air interface technology, such as an S1 interface. The access network device 120 may be a base station (BS) which is a device deployed in the RAN for providing a wireless communication function for a terminal. The base station may include various forms of macro base stations, micro base stations, relay stations, access points, and the like. In systems adopting different wireless access technologies, a device functioning as base station is differently named. For example, in the 5G system, the device is named gNodeB or gNB. With the evolution of communication technologies, the name "base station" may change. For convenience of description, in the embodiment of the present disclosure, the above devices that provide the wireless communication function for the terminal are collectively called an access network device.

The access network device 120 is configured to provide a service for the unmanned aerial vehicle 13. A wireless connection may be established between the unmanned aerial vehicle 13 and the access network device 120. For example, the unmanned aerial vehicle 13 and the access network device 120 communicate with each other by virtue of the air interface technology, such as the cellular technology. The access network device 120 may control the unmanned aerial vehicle 13 over the wireless connection, and the unmanned aerial vehicle 13 may operate under the control of the access network device 120.

Optionally, the access network device 120 is configured to provide a service for the terminal in addition to providing the service for the unmanned aerial vehicle 13. The terminal may include various handheld devices, vehicle-mounted devices, wearable devices and computing devices, which have the wireless communication function, or other processing devices connected to wireless modems, and various forms of user equipment (UE), and mobile stations. (MS), terminal devices and the like. For convenience of description, the devices mentioned above are collectively referred to as the terminal.

The unmanned aerial vehicle (UAV) 13 is an unmanned aircraft manipulated by a radio remote control device and a self-provided program control apparatus. The unmanned aerial vehicle is actually a general term of unmanned aircrafts, and the unmanned aerial vehicles may include an unmanned fixed-wing aircraft, an unmanned vertical take-off and landing aircraft, an unmanned airship, an unmanned helicopter, an unmanned multi-rotor aircraft, an unmanned parawing aircraft, and the like.

The unmanned aerial vehicle 13 has been widely used in fields such as aerial photography, agriculture, plant protection, micro self-photographing, express transportation, disaster rescue, observation of wild animals, monitoring of infectious diseases, surveying and mapping, news reporting, power inspection, disaster relief, film and television shooting and romance creation. For further expanding the application range of the unmanned aerial vehicle 13, relevant international standard organizations have also established a project to study and standardize how to make a cellular network provide services that meet demands for the unmanned aerial vehicle 13.

The technical solution according to the embodiment of the present disclosure is applicable to the 5G system, and is also applicable to an evolution system of the 5G system.

Figure 2:
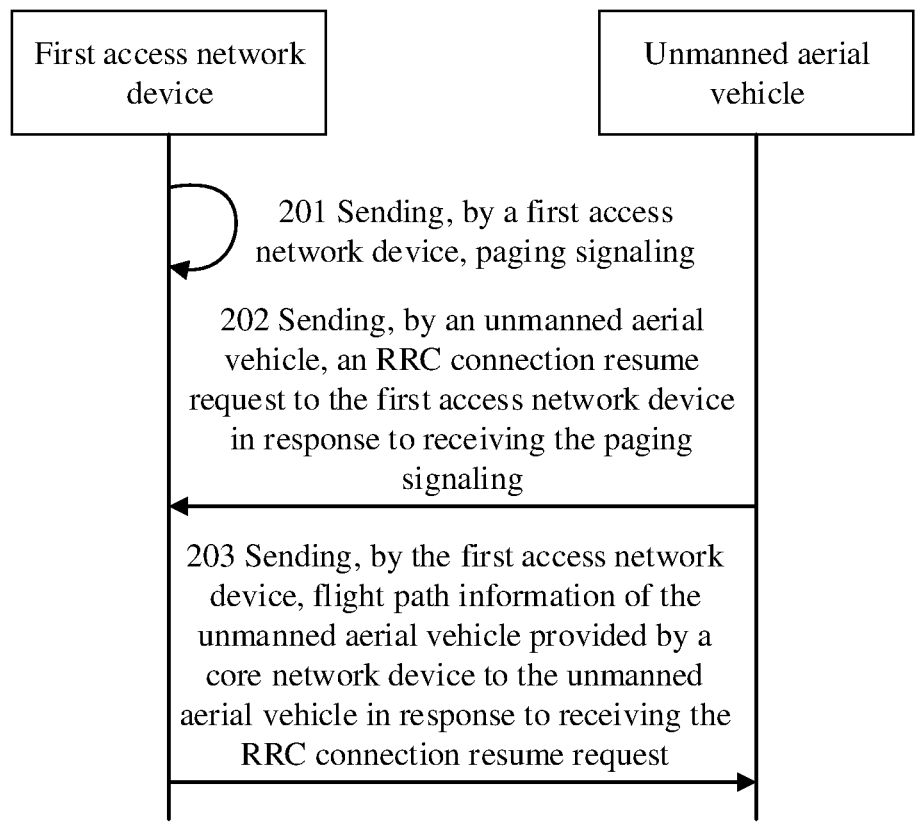
FIG. 2 is a flowchart of a method for providing a flight path of an unmanned aerial vehicle according to one exemplary embodiment.

FIG. 2 is a flowchart of a method for providing a flight path of an unmanned aerial vehicle according to one exemplary embodiment. The method is applicable to the network architecture shown in FIG. 1. The method includes the following several steps.

In step 201, a first access network device sends paging signaling.

The paging signaling is used to page the unmanned aerial vehicle in an inactive state. In the embodiment of the present disclosure, the first access network device refers to an access network device currently serving the unmanned aerial vehicle, that is, an access network device in a cell where the unmanned aerial vehicle is located. Optionally, the first access network device may page the unmanned aerial vehicle by RAN-initiated paging. Optionally, the paging signaling includes identification information of the unmanned aerial vehicle.

Optionally, the first access network device sends the paging signaling under the following two conditions: (1) the first access network device sends the paging signaling used to page the unmanned aerial vehicle in response to receiving flight path information of the unmanned aerial vehicle from a core network device; and (2) the first access network device sends the paging signaling used to page the unmanned aerial vehicle upon receiving a notification message from the other access network devices for indicating paging of the unmanned aerial vehicle.

In addition, an RRC connection may be established between the access network device (such the first access network device) and the unmanned aerial vehicle, and the signaling and/or data is transmitted over this RRC connection. Optionally, states of the unmanned aerial vehicle may include an idle state, a connected state and an inactive state based on states of the RRC connection. The idle state refers to that no RRC connection is established between the unmanned aerial vehicle and the access network device. The connected state refers to that the RRC connection has been established between the unmanned aerial vehicle and the access network device and the RRC connection is in an active state. The inactive state refers to that the RRC connection has been established between the unmanned aerial vehicle and the access network device and the RRC connection is in the inactive state. Where the unmanned aerial vehicle is in the inactive state, as the first access network device cannot send the flight path information to the unmanned aerial vehicle over an RRC message, the first access network device pages the unmanned aerial vehicle by RAN-initiated paging.

In step 202, the unmanned aerial vehicle sends an RRC connection resume request to the first access network device in response to receiving the paging signaling.

In response to receiving the paging signaling, the unmanned aerial vehicle may determine whether the paging signaling received thereby is paging for itself based on the identification information of the unmanned aerial vehicle carried in the paging signaling. If the unmanned aerial vehicle determines that this paging is the paging for itself, the unmanned aerial vehicle sends the RRC connection resume request to the first access network device. The RRC connection resume request is used to request resuming of the RRC connection with the first access network device.

In addition, if the unmanned aerial vehicle determines that this paging signaling received thereby is not paging for itself, the unmanned aerial vehicle does not have to perform the step of sending the RRC connection resume request to the first access network device and the unmanned aerial vehicle may remain in the inactive state.

In step 203, the first access network device sends the flight path information of the unmanned aerial vehicle provided by the core network device to the unmanned aerial vehicle in response to receiving the RRC connection resume request.

In response to receiving the RRC connection resume request, the first access network device may decide whether to resume the RRC connection with the unmanned aerial vehicle. In addition, in the embodiment of the present disclosure, the first access network device may also send the flight path information to the unmanned aerial vehicle in an RRC connection resume process or in response to receiving the RRC connection.

In the embodiment of the present disclosure, the flight path information of the unmanned aerial vehicle may include a flight path of the unmanned aerial vehicle. For example, the flight path of the unmanned aerial vehicle may be a flight path planned by the core network device for the unmanned aerial vehicle or a flight path acquired by the core network device from an unmanned aerial vehicle management system and planned by the unmanned aerial vehicle management system for the unmanned aerial vehicle.

In addition, in the embodiment of the present disclosure, the flight path information of the unmanned aerial vehicle is provided to the unmanned aerial vehicle by the core network device. Optionally, the core network device is a mobile management network element in the core network. The mobile management network element is a functional network element responsible for access authentication and mobility management. For example, in the 5G system, the mobile management network element may be an AMF entity.

In addition, the flight path information of the unmanned aerial vehicle may be sent to the first access network device by the core network device, or sent to the other access network devices by the core network device and then the first access network device acquires the flight path information of the unmanned aerial vehicle from the other access network devices. These two cases will be introduced and explained respectively in embodiments of FIG. 3 and FIG. 4. Optionally, the core network device interacts with the access network device by a communication interface. For example, in the 5G system, the communication interface may be an NG interface.

In the embodiment of the present disclosure, the first access network device may send the flight path information of the unmanned aerial vehicle to the unmanned aerial vehicle in any of the following fashions.

1. The first access network device sends RRC connection resume signaling to the unmanned aerial vehicle, wherein the RRC connection release signaling carries the flight path information of the unmanned aerial vehicle.

For example, when the first access network device decides to resume the RRC connection with the unmanned aerial vehicle, the first access network device sends the RRC connection resume signaling to the unmanned aerial vehicle. At the same time, the first access network device may also carry the flight path information of the unmanned aerial vehicle in the RRC connection resume signaling and then send the same to the unmanned aerial vehicle, such that the unmanned aerial vehicle may acquire the flight path information punctually, and the signaling overhead is saved.

2. The first access network device sends RRC connection release signaling to the unmanned aerial vehicle, wherein the RRC connection resume signaling carries the flight path information of the unmanned aerial vehicle.

For example, when the first access network device decides to release the RRC connection with the unmanned aerial vehicle, the first access network device sends the RRC connection release signaling to the unmanned aerial vehicle. At the same time, the first access network device may also carry the flight path information of the unmanned aerial vehicle in the RRC connection release signaling and then send the same to the unmanned aerial vehicle, such that the unmanned aerial vehicle may acquire the flight path information punctually and the signaling overhead is saved.

3. The first access network device sends the flight path information of the unmanned aerial vehicle to the unmanned aerial vehicle over an RRC connection in response to resuming the RRC connection with the unmanned aerial vehicle.

For example, the first access network device may send an RRC message to the unmanned aerial vehicle over an RRC connection in response to resuming the RRC connection with the unmanned aerial vehicle, wherein the RRC message carries the flight path information of the unmanned aerial vehicle.

In summary, in the technical solution according to the embodiment of the present disclosure, for the unmanned aerial vehicle in the inactive state, the access network device sends the paging signaling to the unmanned aerial vehicle; the unmanned aerial vehicle sends the RRC connection resume request to the access network device in response to receiving the paging signaling from the access network device for the unmanned aerial vehicle; and the access network device subsequently sends the flight path information of the unmanned aerial vehicle provided by the core network device to the unmanned aerial vehicle, in the RRC connection resume process or in response to resuming the RRC connection. In this way, the flight path information of the unmanned aerial vehicle is issued, such that the unmanned aerial vehicle can acquire the flight path information.

Figure 3:
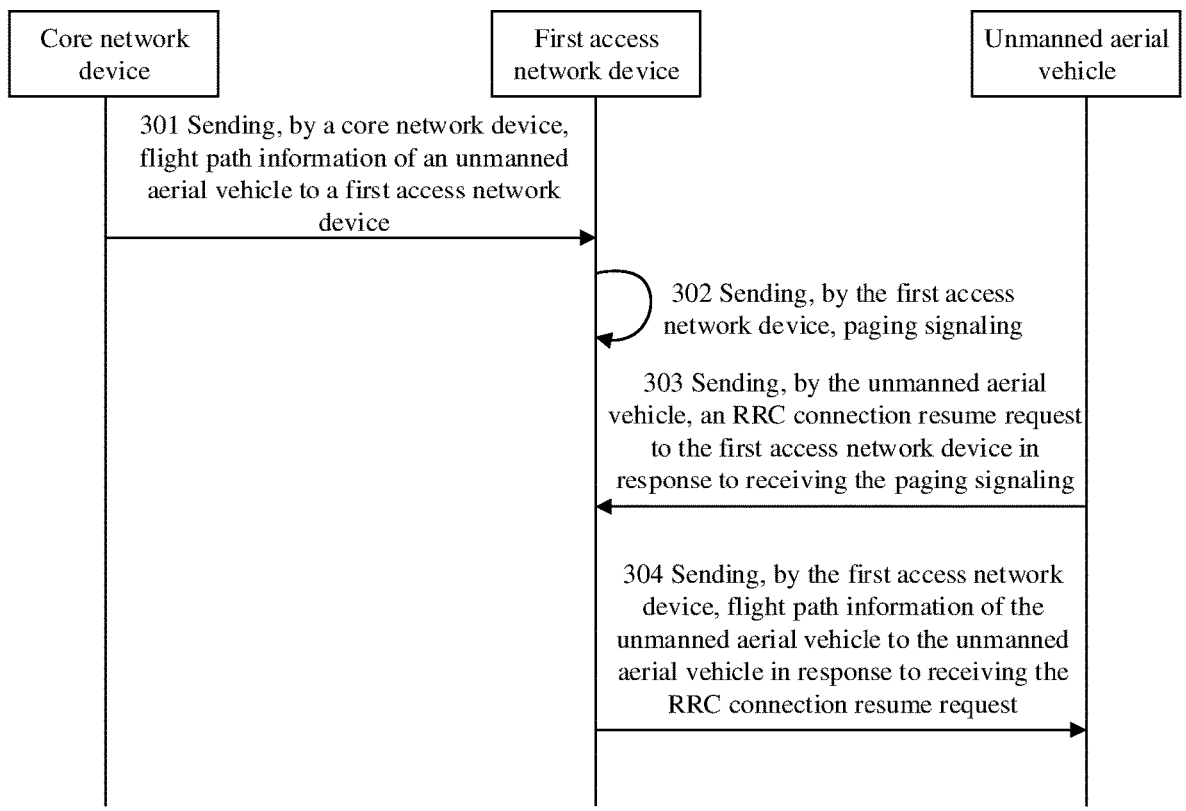
FIG. 3 is a flowchart of a method for providing a flight path of an unmanned aerial vehicle according to another exemplary embodiment.

FIG. 3 is a flowchart of a method for providing a flight path of an unmanned aerial vehicle according to still another exemplary embodiment. The method is applicable to the network architecture shown in FIG. 1. The method includes the following several steps.

In step 301, a core network device sends flight path information of the unmanned aerial vehicle to a first access network device.

In response to acquiring the flight path information of the unmanned aerial vehicle, the core network device sends the flight path information of the unmanned aerial vehicle to a previous access network device serving the unmanned aerial vehicle. The previous access network device serving the unmanned aerial vehicle refers to an access network device which establishes an RRC connection with the unmanned aerial vehicle when the unmanned aerial vehicle enters a connected state preceding an inactive state. In this embodiment, the previous access network device serving the unmanned aerial vehicle is also the first access network device. That is, after the unmanned aerial vehicle is switched from the connected state to the inactive state, a cell where the unmanned aerial vehicle is located has not changed, and the unmanned aerial vehicle is still in the cell corresponding to the first access network device.

Optionally, the core network device sends a UE context modification request to the first access network device, and the UE context modification request carries the flight path information of the unmanned aerial vehicle. By carrying the flight path information of the unmanned aerial vehicle in the UE context modification request and sending the same to the first access network device, the signaling overhead is saved. Optionally, in response to receiving the UE context modification request, the first access network device further sends a UE context modification response to the core network device.

In other possible embodiments, the core network device may also carry the flight path information of the unmanned aerial vehicle in other signaling or predetermined signaling dedicated to transmitting the flight path information, which is not limited in the embodiment of the present disclosure.

In step 302, the first access network device sends paging signaling.

In response to receiving the flight path information of the unmanned aerial vehicle from the core network device, the first access network device pages the unmanned aerial vehicle by RAN-initiated paging.

Optionally, the first access network device also sends a notification message for indicating paging of the unmanned aerial vehicle to the other access network devices, such that the other access network devices also send the paging signaling to page the unmanned aerial vehicle. For example, the first access network device sends the notification message for indicating paging of the unmanned aerial vehicle to the other access network devices in a wireless notification region where the first access network device is located, such that the other access network devices in the wireless notification region also send the paging signaling to page the unmanned aerial vehicle. One wireless notification region may include a cell range covered by one or more access network devices.

In step 303, the unmanned aerial vehicle sends an RRC connection resume request to the first access network device in response to receiving the paging signaling.

In step 304, the first access network device sends the flight path information of the unmanned aerial vehicle to the unmanned aerial vehicle in response to receiving the RRC connection resume request.

Steps 302 to 304 are the same as or similar to steps 201 to 203 in the embodiment in FIG. 2, and reference may be made to the introduction and description in the embodiment in FIG. 2 for details about these steps, which are not repeatedly described in this embodiment.

In summary, in the technical solution according to the embodiment of the present disclosure, for the unmanned aerial vehicle in the inactive state, the access network device sends the flight path information of the unmanned aerial vehicle provided by the core network device, and then the access network device sends the flight path information of the unmanned aerial vehicle to the unmanned aerial vehicle. In this way the flight path information of the unmanned aerial vehicle is issued, such that the unmanned aerial vehicle can acquire the flight path information.

Figure 4:
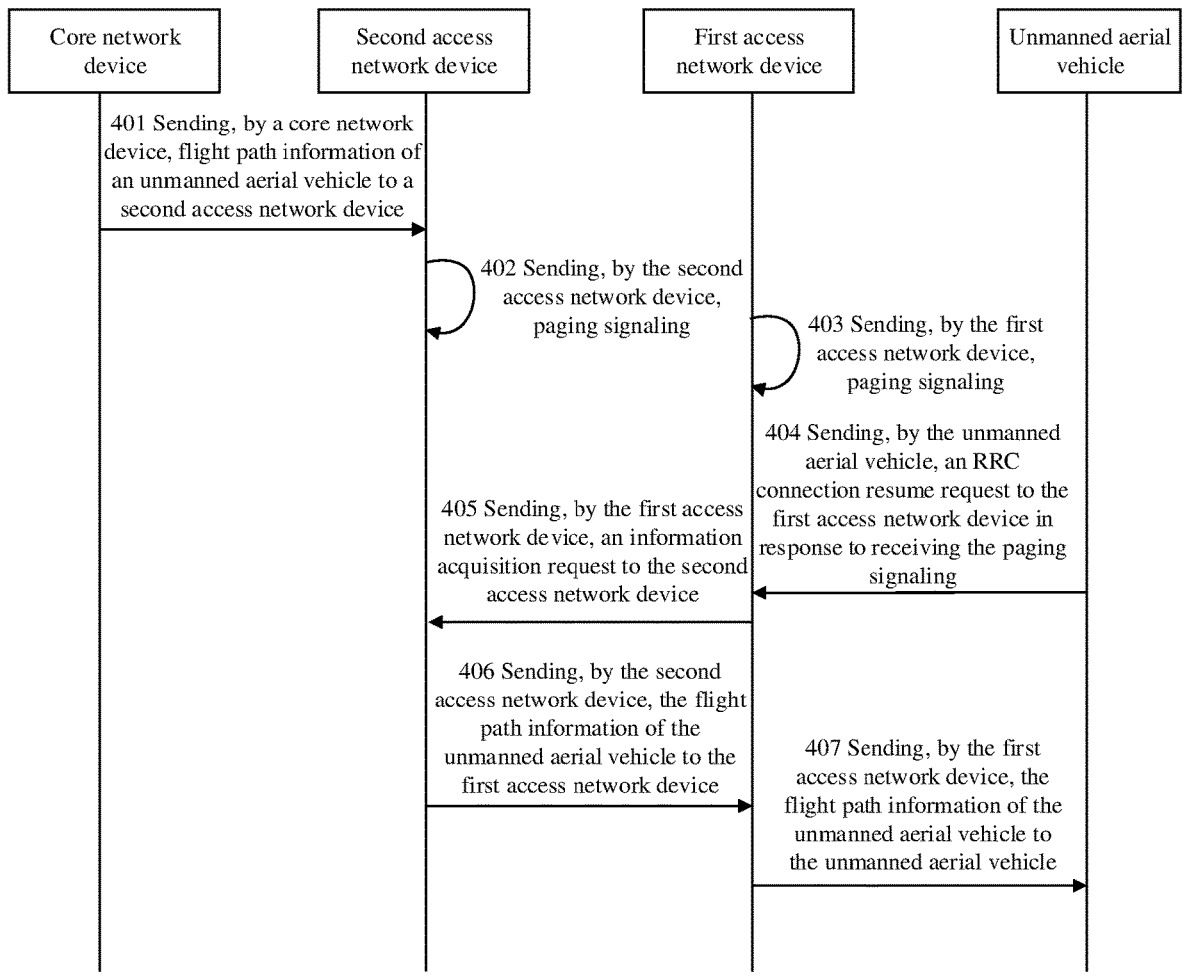
FIG. 4 is a flowchart of a method for providing a flight path of an unmanned aerial vehicle according to still another exemplary embodiment.

FIG. 4 is a flowchart of a method for providing a flight path of an unmanned aerial vehicle according to still another exemplary embodiment. The method is applicable to the network architecture shown in FIG. 1. The method includes the following several steps.

In step 401, a core network device sends flight path information of the unmanned aerial vehicle to a second access network device.

The second access network device may be an access network device that historically serves the unmanned aerial vehicle. Optionally, the second access network device is a previous access network device serving the unmanned aerial vehicle.

The method procedure that the core network device sends the flight path information of the unmanned aerial vehicle to the second access network device is the same as the method procedure that the core network device sends the flight path information of the unmanned aerial vehicle to the first access network device introduced in the embodiment in FIG. 3, and reference may be made to the introduction and description in the embodiment in FIG. 3 for details of this procedure, which are not repeatedly described in this embodiment.

In this embodiment, it is assumed that a cell where the unmanned aerial vehicle is located changes after the unmanned aerial vehicle is switched from a connected state to an inactive state, when the unmanned aerial vehicle is in the connected state, the unmanned aerial vehicle is located in a cell corresponding to the second access network device; and when the unmanned aerial vehicle is in the inactive state, the unmanned aerial vehicle is currently located in a cell corresponding to the first access network device. The first access network device and the second access network device are two different access network devices.

In step 402, the second access network device sends paging signaling.

In response to receiving the flight path information of the unmanned aerial vehicle from the core network device, the second access network device pages the unmanned aerial vehicle by RAN-initiated paging.

Optionally, the second access network device also sends a notification message for indicating of paging the unmanned aerial vehicle to the other access network devices, such that the other access network devices also send the paging signaling to page the unmanned aerial vehicle. For example, the second access network device sends the notification message for indicating paging of the unmanned aerial vehicle to the other access network devices in a wireless notification region where the second access network device is located, such that the other access network devices in the wireless notification region also send the paging signaling to page the unmanned aerial vehicle. One wireless notification region may include a cell range covered by one or more access network devices.

For example, when the second access network device and the first access network device belong to the same wireless notification region, the first access network device receives a notification message from the second access network device and perform the following step 403.

In step 403, the first access network device sends paging signaling.

In response to receiving the notification message from the second access network device for indicating paging of the unmanned aerial vehicle, the first access network device also pages the unmanned aerial vehicle by RAN-initiated paging.

In addition, the execution sequence of step 402 and step 403 is not limited in the embodiment of the present disclosure. For example, step 402 may be executed before or after step 403, or step 402 and step 403 are executed at the same time.

In step 404, the unmanned aerial vehicle sends an RRC connection resume request to the first access network device in response to receiving the paging signaling.

In step 405, the first access network device sends an information acquisition request to the second access network device.

The first access network device sends the information acquisition request to the second access network device in response to receiving the RRC connection resume request from the unmanned aerial vehicle, wherein the information acquisition request is used to request the flight path information of the unmanned aerial vehicle.

The information acquisition request may be a UE context acquisition request so as to acquire context information of the unmanned aerial vehicle.

In step 406, the second access network device sends the flight path information of the unmanned aerial vehicle to the first access network device.

Optionally, the second access network device sends a UE context acquisition response to the first access network device, and the UE context acquisition response carries the flight path information of the unmanned aerial vehicle.

In other possible embodiments, the second access network device may also carry the flight path information of the unmanned aerial vehicle in other signaling or predetermined signaling dedicated to transmitting the flight path information, which is not limited in the embodiment of the present disclosure.

In step 407, the first access network device sends the flight path information of the unmanned aerial vehicle to the unmanned aerial vehicle.

This step is the same as step 203 in the embodiment in FIG. 2 and reference may be made to the introduction and description in the embodiment in FIG. 2 for details about this step, which are not repeatedly described in this embodiment.

In summary, in the technical solution according to the embodiment of the present disclosure, for the unmanned aerial vehicle in the inactive state, the unmanned aerial vehicle is paged in the wireless notification region; and after the first access network device currently serving the unmanned aerial vehicle has paged the unmanned aerial vehicle, the first access network device requests acquisition of the flight path information of the unmanned aerial vehicle from the (previous) second access network device serving the unmanned aerial vehicle; and then the first access network device sends the flight path information of the unmanned aerial vehicle to the unmanned aerial vehicle. In this way, the flight path information of the unmanned aerial vehicle is issued, such that the unmanned aerial vehicle can acquire the flight path information.

It should be noted that in the above method embodiments, the technical solutions of the present disclosure are introduced and explained only from the perspective of the interaction between the access network device and the unmanned aerial vehicle. The above steps related to the first access network device may be implemented separately as the method for providing the flight path of the unmanned aerial vehicle on the first access network device side. The above steps related to the unmanned aerial vehicle may be separately implemented as the method for acquiring the flight path of the unmanned aerial vehicle on the unmanned aerial vehicle side.

Described above are apparatus embodiments of the present disclosure, which may be employed to practice the method embodiments of the present disclosure. For details not disclosed in the apparatus embodiments of the present disclosure, reference may be made to the method embodiments of the present disclosure.

Figure 5:
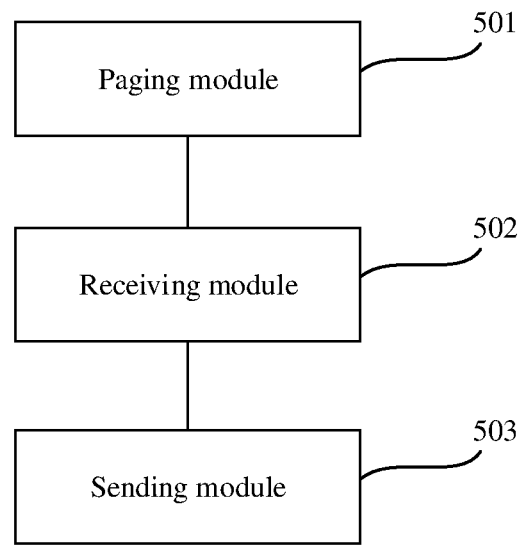
FIG. 5 is a block diagram of an apparatus for providing a flight path of an unmanned aerial vehicle according to an exemplary embodiment.

FIG. 5 is a block diagram of an apparatus for providing a flight path of an unmanned aerial vehicle according to an exemplary embodiment. The apparatus has the function of practicing the above method example on the access network device side. The function may be implemented by hardware or implemented by executing corresponding software by hardware. The apparatus may be the first access network device introduced above or disposed in the first access network device. The apparatus includes: a paging module 501, a receiving module 502, and a sending module 503.

The paging module 501 is configured to send paging signaling, wherein the paging signaling is used to page the unmanned aerial vehicle in an inactive state.

The receiving module 502 is configured to receive an RRC connection resume request from the unmanned aerial vehicle in response to receiving the paging signaling by the unmanned aerial vehicle.

The sending module 503 is configured to send flight path information of the unmanned aerial vehicle provided by a core network device to the unmanned aerial vehicle in response to receiving the RRC connection resume request.

In summary, in the technical solution according to the embodiment of the present disclosure, for the unmanned aerial vehicle in the inactive state, the access network device sends the paging signaling to the unmanned aerial vehicle; the unmanned aerial vehicle sends the RRC connection resume request to the access network device in response to receiving the paging signaling from the access network device for the unmanned aerial vehicle; and the access network device subsequently sends the flight path information of the unmanned aerial vehicle provided by the core network device to the unmanned aerial vehicle, in an RRC connection resume process or in response to receiving the RRC connection. In this way, the flight path information of the unmanned aerial vehicle is issued, such that the unmanned aerial vehicle can acquire the flight path information.

In one optional embodiment based on the embodiment in FIG. 5, the receiving module 502 is further configured to receive the flight path information of the unmanned aerial vehicle from the core network device.

Optionally, the receiving module 502 is further configured to receive a UE context modification request from the core network device, wherein the UE context modification request carries the flight path information of the unmanned aerial vehicle.

In another optional embodiment based on the embodiment in FIG. 5, the receiving module 502 is further configured to receive the flight path information of the unmanned aerial vehicle from a second access network device.

The flight path information of the unmanned aerial vehicle is sent to the second access network device by the core network device and the second access network device is a previous access network device serving the unmanned aerial vehicle.

Optionally, the sending module 503 is further configured to send an information acquisition request to the second access network device, wherein the information acquisition request is used to request the flight path information of the unmanned aerial vehicle.

The receiving module 502 is further configured to receive the flight path information of the unmanned aerial vehicle from the second access network device.

In still another optional embodiment based on the embodiment in FIG. 5 or any one of above optional embodiments, the sending module 503 is configured to send RRC connection release signaling to the unmanned aerial vehicle, wherein the RRC connection release signaling carries the flight path information of the unmanned aerial vehicle; or send RRC connection resume signaling to the unmanned aerial vehicle, wherein the RRC connection resume signaling carries the flight path information of the unmanned aerial vehicle; or send the flight path information of the unmanned aerial vehicle to the unmanned aerial vehicle over an RRC connection in response to resuming the RRC connection with the unmanned aerial vehicle.

Figure 6:
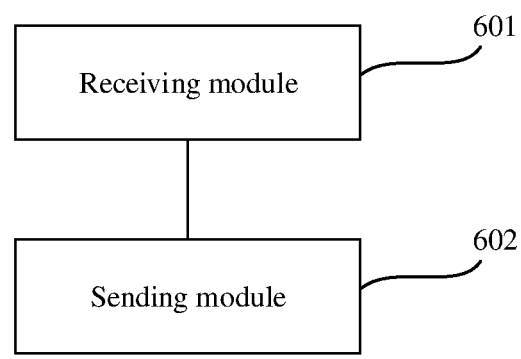
FIG. 6 is a block diagram of an apparatus for acquiring a flight path of an unmanned aerial vehicle according to an exemplary embodiment.

FIG. 6 is a block diagram of an apparatus for acquiring a flight path of an unmanned aerial vehicle according to an exemplary embodiment. The apparatus has the function of practicing the above method example on the unmanned aerial vehicle side. The function may be implemented by hardware or implemented by executing corresponding software by hardware. The apparatus may be the unmanned aerial vehicle introduced above or disposed in the unmanned aerial vehicle. The apparatus includes a receiving module 601 and a sending module 602.

The receiving module 601 is configured to receive paging signaling from a first access network device, wherein the paging signaling is used to page the unmanned aerial vehicle in an inactive state.

The sending module 602 is configured to send an RRC connection resume request to the first access network device in response to receiving the paging signaling.

The receiving module 601 is further configured to receive flight path information of the unmanned aerial vehicle provided by a core network device from the first access network device.

In summary, in the technical solution according to the embodiment of the present disclosure, for the unmanned aerial vehicle in the inactive state, the access network device sends the paging signaling to the unmanned aerial vehicle; the unmanned aerial vehicle sends the RRC connection resume request to the access network device in response to receiving the paging signaling from the access network device for the unmanned aerial vehicle; and the access network device subsequently sends the flight path information of the unmanned aerial vehicle provided by the core network device to the unmanned aerial vehicle, in an RRC connection resume process or in response to resuming the RRC connection. In this way, the flight path information of the unmanned aerial vehicle is issued, such that the unmanned aerial vehicle can acquire the flight path information.

In one optional embodiment based on the embodiment in FIG. 6, the receiving module 601 is further configured to receive RRC connection release signaling from the first access network device, wherein the RRC connection release signaling carries the flight path information of the unmanned aerial vehicle; or receive RRC connection resume signaling from the first access network device, wherein the RRC connection resume signaling carries the flight path information of the unmanned aerial vehicle; or receive the flight path information of the unmanned aerial vehicle from the first access network device over an RRC connection in response to resuming the RRC connection with the first access network device.

It should be noted that the apparatus according to the above embodiment is only illustrated by the division of various functional modules when implementing its function. In practical application, the above functions may be assigned to be completed by different functional modules according to actual needs, that is, the content structure of the device is divided into different functional modules to complete all or part of the functions described above.

With regard to the apparatus in the above embodiments, the details about the respective modules and the operations performed by these modules have been described in detail in the embodiments of the related method, which are not described in detail herein.

An exemplary embodiment of the present disclosure also provides a device for providing a flight path of an unmanned aerial vehicle, which is capable of performing the method for providing the flight path of the unmanned aerial vehicle according to the present disclosure. The device is applicable to the first access network device introduced above or configured in the first access network device. The device includes a processor, and a memory configured to store at least one instruction executable by the processor. The processor is configured to:

send paging signaling, wherein the paging signaling is used to page the unmanned aerial vehicle in an inactive state;

receive an RRC connection resume request sent from the unmanned aerial vehicle in response to receiving the paging signaling; and send flight path information of the unmanned aerial vehicle provided by a core network device to the unmanned aerial vehicle in response to receiving the RRC connection resume request.

Optionally, the processor is further configured to receive the flight path information of the unmanned aerial vehicle from the core network device.

Optionally, the processor is further configured to receive a UE context modification request from the core network device, wherein the UE context modification request carries the flight path information of the unmanned aerial vehicle.

Optionally, the processor is further configured to receive the flight path information of the unmanned aerial vehicle from a second access network device. The flight path information of the unmanned aerial vehicle is sent to the second access network device by the core network device, and the second access network device is a previous access network device serving the unmanned aerial vehicle.

Optionally, the processor is further configured to send an information acquisition request to the second access network device, wherein the information acquisition request is used to request the flight path information of the unmanned aerial vehicle; and receive the flight path information of the unmanned aerial vehicle from the second access network device.

Optionally, the processor is further configured to send RRC connection resume signaling to the unmanned aerial vehicle, wherein the RRC connection resume signaling carries the flight path information of the unmanned aerial vehicle; or send RRC connection release signaling to the unmanned aerial vehicle, wherein the RRC connection release signaling carries the flight path information of the unmanned aerial vehicle; or send the flight path information of the unmanned aerial vehicle to the unmanned aerial vehicle over an RRC connection in response to resuming the RRC connection with the unmanned aerial vehicle.

An exemplary embodiment of the present disclosure also provides a device for acquiring a flight path of an unmanned aerial vehicle, which is capable of performing the method for acquiring the flight path of the unmanned aerial vehicle according to the present disclosure. The device is applicable to the unmanned aerial vehicle introduced above or configured in the unmanned aerial vehicle. The device includes a processor, and a memory configured to store at last one instruction executable by the processor. The processor is configured to:

receive paging signaling from a first access network device, wherein the paging signaling is used to page the unmanned aerial vehicle in an inactive state;

send an RRC connection resume request to the first access network device in response to receiving the paging signaling; and receive flight path information of the unmanned aerial vehicle provided by a core network device from the first access network device.

Optionally, the processor is further configured to receive RRC connection resume signaling from the first access network device, wherein the RRC connection resume signaling carries the flight path information of the unmanned aerial vehicle; or receive RRC connection release signaling from the first access network device, wherein the RRC connection release signaling carries the flight path information of the unmanned aerial vehicle; or receive the flight path information of the unmanned aerial vehicle from the first access network device over an RRC connection in response to resuming the RRC connection with the first access network device.

An exemplary embodiment of the present disclosure also provides a system for providing a flight path of an unmanned aerial vehicle. The system includes the first access network device and the unmanned aerial vehicle which are described above.

The technical solutions according to the embodiment of the present disclosure are mainly introduced from the perspective of the access network device and the unmanned aerial vehicle. It may be understood that for implementing the above functions, the access network device and the unmanned aerial vehicle include corresponding hardware structures and/or software modules for executing various functions. In conjunction with various exemplary units and algorithm steps described in the embodiments disclosed in the present disclosure, the embodiment of the present disclosure may be implemented in the form of hardware or a combination of hardware and computer software. Whether certain function is implemented in the fashion of hardware or in a fashion that computer software drives the hardware depends on particular applications and design constraints of the technical solutions. A person skilled in the art may implement the described functions with different methods for each of particular applications, but such an implementation shall not be regarded as going beyond the scope of the technical solution according to the embodiment of the present disclosure.

Figure 7:
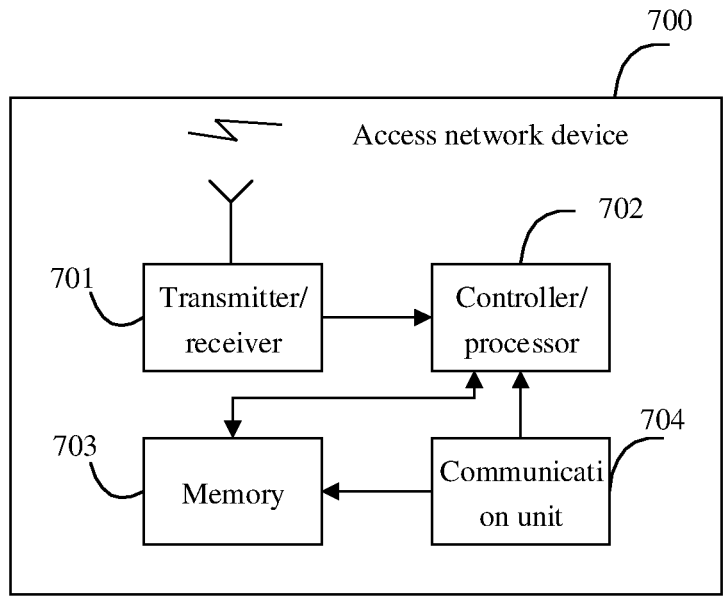
FIG. 7 is a structural diagram of an access network device according to an exemplary embodiment.

FIG. 7 is a structural schematic diagram of an access network device according to an exemplary embodiment.

The access network device 700 includes a transmitter/receiver 701 and a processor 702. The processor 702 may also be a controller and is represented as the "controller/processor 702" in FIG. 7. The transmitter/receiver 701 is configured to support the transceiving of information between the access network device and the terminal in the above embodiments, and to support the communication between the access network device and other network entities. The processor 702 executes various functions for communicating with the terminal. On the uplink, an uplink signal from the terminal is received via an antenna, demodulated by the receiver 701 (for example, a high-frequency signal is demodulated into a baseband signal), and further processed by the processor 702 to resume service data and signaling information from the terminal. On the downlink, the service data and a signaling message are processed by the processor 702, and modulated by the transmitter 701 (for example, the baseband signal is modulated into the high-frequency signal) to generate a downlink signal, which is transmitted to the terminal via the antenna. It should be noted that the demodulation or modulation function may also be completed by the processor 702. For example, the processor 702 is further configured to perform various steps on the access network device (such as the first access network device and the second access network device) side in the above method embodiment, and/or other steps of the technical solution according to the embodiment of the present disclosure.

Further, the access network device 700 may also include a memory 703 for storing a program code and data of the access network device 700. In addition, the access network device may further include a communication unit 704. The communication unit 704 is configured to support communication between the access network device and other network entities (such as network devices in the core network). For example, in the 5G system, the communication unit 704 may be an NG-U interface for supporting the access network device to communicate with a UPF entity; or an NG-C interface for supporting access to an AMF entity for communication.

It may be understood that FIG. 7 only shows simplified design of the access network device 700. In practical application, the access network device 700 may include any number of transmitters, receivers, processors, controllers, memories, communication units and the like, and all access network devices that may implement the embodiments of the present disclosure are within the scope of protection of the embodiments of the present disclosure.

Figure 8:
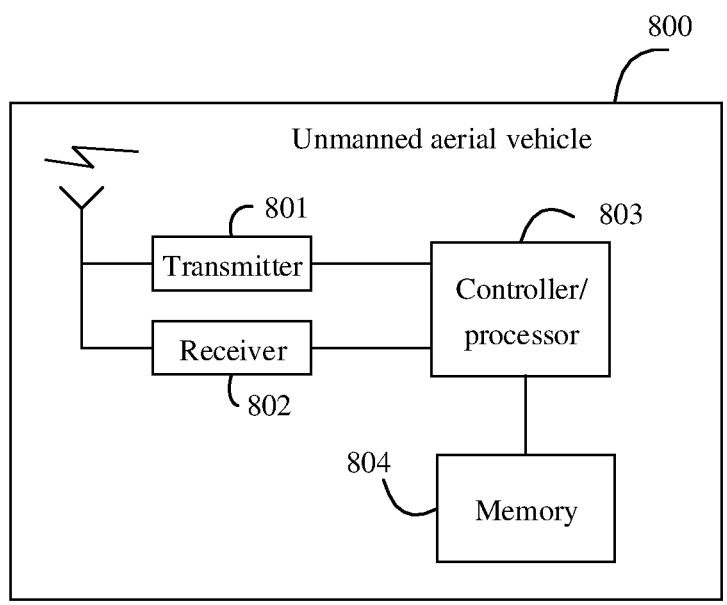
FIG. 8 is a structural diagram of an unmanned aerial vehicle according to an exemplary embodiment.

FIG. 8 is a structural diagram of an unmanned aerial vehicle according to an exemplary embodiment.

The unmanned aerial vehicle 800 includes a transmitter 801, a receiver 802, and a processor 803. The processor 803 may also be a controller and is represented as the "controller/processor 803" in FIG. 8.

The processor 803 controls and manages the action of the unmanned aerial vehicle 800, and is configured to perform the processing process performed by the unmanned aerial vehicle 800 in the above embodiment of the present disclosure. For example, the processor 803 is configured to perform various steps on the unmanned aerial vehicle side in the above method embodiment, and/or other steps of the technical solution described in the embodiment of the present disclosure.

Further, the unmanned aerial vehicle 800 may also include a memory 804 for storing a program code and data for the unmanned aerial vehicle 800.

It may be understood that FIG. 8 only shows simplified design of the unmanned aerial vehicle 800. In practical applications, the unmanned aerial vehicle 800 may include any number of transmitters, receivers, processors, controllers, memories and the like, and all unmanned aerial vehicles that may implement the embodiments of the present disclosure are within the scope of protection of the embodiments of the present disclosure.

An embodiment of the present disclosure further provides a non-transitory computer-readable storage medium. The non-transitory computer-readable storage medium stores at least one computer program thereon, which, when executed by a processor of a first access network device, causes the first access network device to perform steps of the method for providing the flight path of the unmanned aerial vehicle.

An embodiment of the present disclosure further provides a non-transitory computer-readable storage medium. The non-transitory computer-readable storage medium stores at least one computer program thereon, which, when executed by a processor of an unmanned aerial vehicle, causes the unmanned aerial vehicle to perform steps of the method for acquiring the flight path of the unmanned aerial vehicle.

It should be understood that the term "a plurality of" mentioned herein means two or more, and the term "and/or" describes an association relationship of associated objects, indicating three types of relationships, for example, A and/or B may indicate three situations: A exists alone, A and B exist simultaneously, and B exists alone. The symbol "/" generally indicates an "OR" relationship between the contextual objects.

Other embodiments of the present disclosure will be apparent to those skilled in the art from consideration of the description and practice of the present disclosure. The present disclosure is intended to cover any variations, uses, or adaptations of the present disclosure following general principles of the present disclosure and including the common general knowledge or conventional technical means in the art which is not disclosed in the present disclosure. The description and embodiments are to be considered as exemplary only, with a true scope and spirit of the present disclosure being indicated by the following claims.

It should be understood that the present disclosure is not limited to the exact constructions that has been described above and shown in the accompanying drawings, and that various modifications and changes may be made without departing from the scope thereof. The scope of the present disclosure is only subject to the appended claim.

What is claimed is:

1. A method for providing a flight path of an unmanned aerial vehicle, comprising:
sending, by a first access network device, paging signaling, wherein the paging signaling is configured to page the unmanned aerial vehicle in an inactive state;
receiving, by the first access network device, a radio resource control (RRC) connection resume request sent from the unmanned aerial vehicle in response to receiving the paging signaling; and
sending, by the first access network device, flight path information of the unmanned aerial vehicle provided by a core network device to the unmanned aerial vehicle in response to receiving the RRC connection resume request,
wherein the method further comprises:
receiving, by the first access network device, the flight path information of the unmanned aerial vehicle from a second access network device, wherein the flight path information of the unmanned aerial vehicle is sent to the second access network device by the core network device, and the second access network device is a previous access network device serving the unmanned aerial vehicle,
wherein receiving, by the first access network device, the flight path information of the unmanned aerial vehicle from the second access network device comprises:
sending, by the first access network device, an information acquisition request to the second access network device, wherein the information acquisition request is configured to request the flight path information of the unmanned aerial vehicle; and
receiving, by the first access network device, the flight path information of the unmanned aerial vehicle from the second access network device after sending the information acquisition request.

2. The method according to claim 1, further comprising:
receiving, by the first access network device, the flight path information of the unmanned aerial vehicle from the core network device.

3. The method according to claim 2, wherein receiving, by the first access network device, the flight path information of the unmanned aerial vehicle from the core network device comprises:
receiving, by the first access network device, a user equipment (UE) context modification request from the core network device, wherein the UE context modification request carries the flight path information of the unmanned aerial vehicle.

4. The method according to claim 1, wherein sending, by the first access network device, the flight path information of the unmanned aerial vehicle provided by the core network device to the unmanned aerial vehicle comprises one of:
sending, by the first access network device, RRC connection resume signaling to the unmanned aerial vehicle, wherein the RRC connection resume signaling carries the flight path information of the unmanned aerial vehicle; or
sending, by the first access network device, RRC connection release signaling to the unmanned aerial vehicle, wherein the RRC connection release signaling carries the flight path information of the unmanned aerial vehicle; or
sending, by the first access network device, the flight path information of the unmanned aerial vehicle to the unmanned aerial vehicle over an RRC connection in response to resuming the RRC connection with the unmanned aerial vehicle.

5. A non-transitory computer-readable storage medium storing a computer program thereon, wherein the computer program, when executed by a processor of a first access network device, cause the first access network device to perform the method of claim 1.

6. A method for acquiring a flight path of an unmanned aerial vehicle, comprising:
receiving, by the unmanned aerial vehicle, paging signaling from a first access network device, wherein the paging signaling is configured to page the unmanned aerial vehicle in an inactive state;
sending, by the unmanned aerial vehicle, a radio resource control (RRC) connection resume request to the first access network device in response to receiving the paging signaling; and
receiving, by the unmanned aerial vehicle, flight path information of the unmanned aerial vehicle provided by a core network device from the first access network device,
wherein the flight path information of the unmanned aerial vehicle is received by the first access network device from a second access network device;
wherein the flight path information of the unmanned aerial vehicle is sent to the second access network device by the core network device, and the second access network device is a previous access network device serving the unmanned aerial vehicle;
wherein prior to receiving the flight path information of the unmanned aerial vehicle from the second access network device, an information acquisition request is sent by the first access network device to the second access network device, wherein the information acquisition request is configured to request the flight path information of the unmanned aerial vehicle.

7. The method according to claim 6, wherein receiving, by the unmanned aerial vehicle, the flight path information of the unmanned aerial vehicle provided by the core network device from the first access network device comprises one of:
receiving, by the unmanned aerial vehicle, RRC connection resume signaling from the first access network device, wherein the RRC connection resume signaling carries the flight path information of the unmanned aerial vehicle; or
receiving, by the unmanned aerial vehicle, RRC connection release signaling from the first access network device, wherein the RRC connection release signaling carries the flight path information of the unmanned aerial vehicle; or
receiving, by the unmanned aerial vehicle, the flight path information of the unmanned aerial vehicle from the first access network device over an RRC connection in response to resuming the RRC connection with the first access network device.

8. An apparatus for acquiring a flight path of an unmanned aerial vehicle, the apparatus being applicable to the unmanned aerial vehicle and comprising:
   a processor; and
   a memory configured to store an instruction executable by the processor;
   wherein the processor is configured to perform the method of claim 6.

9. A non-transitory computer-readable storage medium storing a computer program thereon, wherein the computer program, when executed by a processor of an unmanned aerial vehicle, cause the unmanned aerial vehicle to perform the method of claim 6.

10. An apparatus for providing a flight path of an unmanned aerial vehicle, the apparatus being applicable a first access network device and comprising:
   a processor; and
   a memory configured to store an instruction executable by the processor;
   wherein the processor is configured to:
   send paging signaling, wherein the paging signaling is configured to page the unmanned aerial vehicle in an inactive state;
   receive a radio resource control (RRC) connection resume request sent from the unmanned aerial vehicle in response to receiving the paging signaling; and
   send flight path information of the unmanned aerial vehicle provided by a core network device to the unmanned aerial vehicle in response to receiving the RRC connection resume request,
   wherein the processor is further configured to:
   receive the flight path information of the unmanned aerial vehicle from a second access network device, wherein the flight path information of the unmanned aerial vehicle is sent to the second access network device by the core network device, and the second access network device is a previous access network device serving the unmanned aerial vehicle,
   wherein in receiving the flight path information of the unmanned aerial vehicle from the second access network device, the processor is further configured to:
   send an information acquisition request to the second access network device, wherein the information acquisition request is configured to request the flight path information of the unmanned aerial vehicle; and
   receive the flight path information of the unmanned aerial vehicle from the second access network device after sending the information acquisition request.

11. The apparatus according to claim 10, wherein the processor is further configured to:
   receive the flight path information of the unmanned aerial vehicle from the core network device.

12. The apparatus according to claim 11, wherein the processor is further configured to:
   receive a user equipment (UE) context modification request from the core network device, wherein the UE context modification request carries the flight path information of the unmanned aerial vehicle.

13. The apparatus according to claim 10, wherein the processor is further configured to:
   send RRC connection resume signaling to the unmanned aerial vehicle, wherein the RRC connection resume signaling carries the flight path information of the unmanned aerial vehicle.

14. The apparatus according to claim 10, wherein the processor is further configured to:
   send RRC connection release signaling to the unmanned aerial vehicle, wherein the RRC connection release signaling carries the flight path information of the unmanned aerial vehicle.

15. The apparatus according to claim 10, wherein the processor is further configured to:
   send the flight path information of the unmanned aerial vehicle to the unmanned aerial vehicle over an RRC connection in response to resuming the RRC connection with the unmanned aerial vehicle.

* * * * *